United States Patent
Benzerrouk (10) Patent No.: US 11,072,543 B2
(45) Date of Patent: Jul. 27, 2021

(54) WATER DISINFECTION CHAMBER AND SYSTEM WITH UVC LEDS

(71) Applicant: Canopus Water Technologies, inc., Windham, NH (US)

(72) Inventor: Souheil Benzerrouk, Windham, NH (US)

(73) Assignee: Canopus Water Technologies, Inc., Windham, NH (US)

( * ) Notice: Subject to any disclaimer, the term of this patent is extended or adjusted under 35 U.S.C. 154(b) by 90 days.

(21) Appl. No.: 15/987,147

(22) Filed: May 23, 2018

(65) Prior Publication Data
US 2020/0392019 A1 Dec. 17, 2020

Related U.S. Application Data

(60) Provisional application No. 62/562,774, filed on Sep. 25, 2017, provisional application No. 62/510,989, filed on May 25, 2017.

(51) Int. Cl.
*C02F 1/32* (2006.01)

(52) U.S. Cl.
CPC ...... *C02F 1/325* (2013.01); *C02F 2201/3222* (2013.01); *C02F 2201/3227* (2013.01); *C02F 2201/3228* (2013.01); *C02F 2303/04* (2013.01)

(58) Field of Classification Search
CPC .............. C02F 1/325; C02F 2201/3222; C02F 2201/3227; C02F 2201/3228; C02F 2303/04
See application file for complete search history.

(56) References Cited

U.S. PATENT DOCUMENTS

| | | | |
|---|---|---|---|
| 2006/0163126 A1* | 7/2006 | Maiden | C02F 1/003 210/87 |
| 2015/0060692 A1* | 3/2015 | Chen | C02F 1/325 250/435 |
| 2017/0166457 A1* | 6/2017 | Rimbault | A23L 2/50 |
| 2017/0217791 A1* | 8/2017 | McNulty | C02F 1/325 |
| 2018/0208486 A1* | 7/2018 | Konagayoshi | B01J 19/123 |

\* cited by examiner

*Primary Examiner* — Eliza W Osenbaugh-Stewart
(74) *Attorney, Agent, or Firm* — Bourque & Associates PA (57) ABSTRACT

A water disinfection chamber includes one or more UVC LEDs. The chamber is constructed of Teflon or employs a Teflon PTFE liner to increase UV reflections through the volume of the chamber. LEDs are positioned in specific locations to both provide maximum UV intensity in the main fluid flow path and an angle to allow enough reflections to fill the chamber with UV light to disinfect the fluid flowing through the chamber. The chamber is scalable in size and in the number of LEDs employed including the number of rings where LEDs are located.

18 Claims, 7 Drawing Sheets

WATER DISINFECTION CHAMBER AND SYSTEM WITH UVC LEDS

CROSS-REFERENCE TO RELATED APPLICATIONS

This application is a continuation of and claims priority from U.S. Provisional Patent Application No. 62/510,989 filed on May 25, 2017 entitled "A MULTI-CHAMBER WATER DISINFECTION SYSTEM UTILIZING UV LEDs" and US Provisional Patent Application No. 62/562,774 filed on Sep. 25, 2017 entitled "A WATER DISINFECTION REACTOR WITH UV LEDs", both of which applications are incorporated fully herein by reference.

TECHNICAL FIELD

The present invention relates generally to non-chemical water disinfection and, more particularly to utilizing ultraviolet light in the germicidal range to inactivate bacteria and eliminate viruses and micro-organisms.

BACKGROUND INFORMATION

Water disinfection is an integral part of any water treatment system including drinking water, industrial process water, and waste water. Many such systems utilize UV irradiation from low or medium pressure mercury lamps that emit in the germicidal range of 200 nm to 300 nm. Such systems require a yearly lamp replacement, high voltage source and a cleaning routine to ensure the lamp surface is not covered by biofilm. Such lamps are extremely fragile due to the thin quartz wall that covers them, contain the hazardous mercury gas, require high power to operate, need a lengthy warm up period to start and tend to be expensive for larger sizes.

Recently, UV LEDs in the germicidal range have been introduced with power levels that can provide limited disinfection. LEDs have the obvious benefits of longer life (more than five times that of a traditional lamp) and ruggedness. However, due to the fact that they are point sources they were not considered for larger flow rate applications above 1 gal/per minute. This is largely due to the principal that UV dose is function of light power density and exposure time. An attempt to simply replace the mercury lamps with a string of LEDs in a traditional tubular chamber will prove to be an extremely expensive proposition due to the cost per LEDs, albeit cost is expected to fall significantly once the required power levels are achieved and the appropriate manufacturing volumes are reached. The proposed paradigm involves the proposed chamber designed specifically to take advantage of a high intensity point source.

SUMMARY

A water disinfection chamber that includes one or more UVC LEDs. The chamber may be constructed with Teflon or employs a Teflon PTFE liner to increase UV reflections through the volume of the chamber. LEDs are positioned in specific locations to both provide maximum UV intensity in the main flow path and an angle to allow enough reflections to fill the chamber with UV. The chamber is scalable in size and in the number of LEDs employed including the number of rings where LEDs are located. Chambers can be scaled down to provide disinfection in less than 100 milli-liter/minute in laboratory applications and as large as 100 liter/minute in ballast water applications.

Several embodiments have been devised for various applications such as: combining chamber chambers or chambers for higher flow rates, a battery back-up, unique cooling techniques for the LEDs, and a closed loop control system that controls UV dose based on a flow measurement or UV intensity. Also, a communications system that allows the owner of the disinfection system to monitor the system remotely and receive status updates or notifications.

The present invention features, in one embodiment, a water disinfection chamber comprising a chamber defined by walls and having an inlet, an outlet and one or more LEDs mounted in the chamber walls. The LEDs our configured for emitting sufficient UV light intensity in the germicidal UV range so as to disinfect a flow of liquid flowing through the chamber from the inlet to set outlet. In one embodiment, the chamber is constructed with a UV reflecting material such as Teflon PTFE of an appropriate thickness of more than 1 mm on the chamber walls.

The water disinfection chamber may comprise one or more conical ring areas in the chamber walls in which the one or more LEDs are positioned and arranged in a ring geometry. The ring geometry may be arranged to provide maximum intensity in a restricted flow area within the chamber and are positioned to direct the LED UV light to be reflected in a manner that fills the chamber with UV light. The chamber may include a plurality of conical rings of LEDs positioned conically in an outlet half of the chamber. The plurality of conical LED rings may be disposed in an inlet half, an outlet half, or both the inlet and outlet halves of the chamber.

The water disinfection chamber may include a plurality of LEDs, and wherein UV light beams from each of the plurality of LEDs intersect at one point to create a zone of very high irradiance. The water disinfection chamber may further include one or more water-flow reduction/restriction areas. The one or more water flow reduction/restriction areas may be provided in at least one neck region of the chamber, the at least one neck region disposed in one or more of the chamber inlet and chamber outlet. The at least one neck region allows for multiple, parallel conical rings in which the one or more LEDs are provided. The DV disinfection chamber may further include one or more DV beam diffusing windows configured to fill the chamber with UV irradiation.

In another embodiment of the present invention, the invention includes a UV disinfection system comprising a plurality of water disinfection chambers as described above. The UV disinfection system may include a plurality of water disinfection chambers connected in series. The UV disinfection system may be further configured so as to include a first plurality of series connected water disinfection chambers and at least a second plurality of series connected water disinfection chambers. The first and at least the second plurality of series connected water disinfection chambers may be arranged in a parallel configuration.

In another embodiment, the DV disinfection chamber may further include a cooling structure for the LEDs that takes advantage of the fluid flow through the chamber with heat removed from the LEDs being directed to a separate area of the chamber through a thermal conductor to the neck area of the chamber or via a heat pipe.

Another aspect of the present invention is a UV disinfection system comprising a plurality of UV disinfection chambers arranged in at least one of a series or parallel connection. Each of the plurality of UV disinfection chambers are defined by walls and have an inlet, an outlet and one or more LEDs mounted in the chamber walls. The LEDs are configured for emitting sufficient UV light intensity in the germicidal UV range so as to disinfect a flow of liquid flowing through the chamber from the inlet to set outlet. The system also includes at least one of a liquid flow or a liquid pressure measuring device coupled to a fluid flow to the plurality of DV disinfection chambers, and a controller, configured for managing the UV disinfection chambers and a disinfection loop formed by the plurality of connected UV disinfection chambers.

The controller is responsive to the at least one of a liquid flow or a liquid pressure measuring device, for enabling the LEDs to emit UV light when fluid flow or fluid pressure is detected, and for disabling the LEDs to emit UV light when fluid flow or fluid pressure is absent. The UV disinfection system may further include a communication system, coupled to the controller, for allowing remote monitoring and operation of the UV disinfection system. The communication system may provide alarm or status updates from the UV disinfection system via the controller coupled to the communication system.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

An Ultraviolet water disinfection system utilizing one or more UV chambers or reactor 10, FIG. 1, includes at least one or more UVC LED's 11 appropriately positioned and angled so as to provide high intensity radiation close to the chamber's neck 13 while other UV radiation reflects from the chamber's walls as will be described below. UV (Ultra-violet) light represents wavelengths that fall between visible light and x-ray on the electromagnetic spectrum. The UV range can be further divided into UV-A, UV-B, UV-C, and Vacuum-UV. The UV-C portion of the UV spectrum represents wavelengths from 200 nm-300 nm, the preferred wavelength used in LED disinfection products in accordance with the teachings of the present invention.

Figure 3:
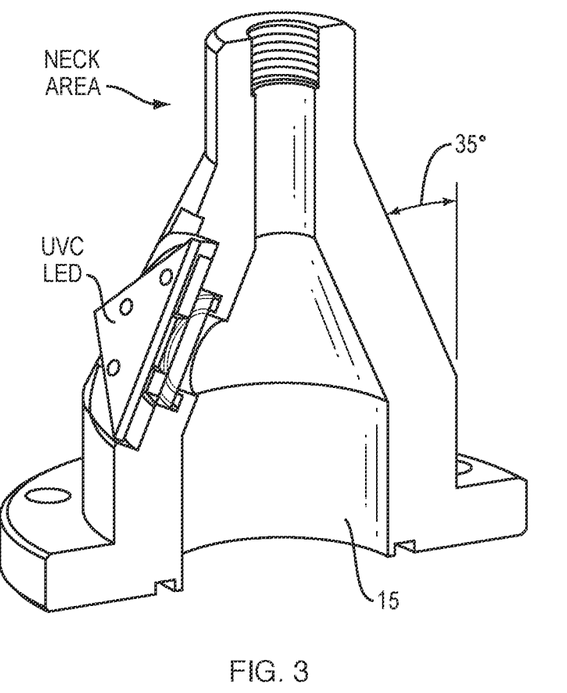
FIG. 3 is a cross-sectional view of the outlet cone and neck area of a water disinfection chamber according to the present invention illustrating the restricted flow area created by the neck in the water disinfection chamber.

The chamber 10 is, in one embodiment, constructed of a UV reflective material such as PTFE Teflon or alternatively, in another embodiment, the chamber 10 may be constructed of a different type of material such as Stainless Steel and lined with a PTFE Teflon liner or other UV reflective material lining the interior wall region 15, FIG. 3, of the chamber 10. The purpose of the high intensity UV dosage and reflectivity of the chamber is to guarantee that the water flowing through the chamber is exposed to a specific UVC dose sufficient to disinfect water to a specific standard or level such as NSF 55 Class A in drinking water (50 mJ/cm2 or higher for systems without UV detectors).

Figure 1:
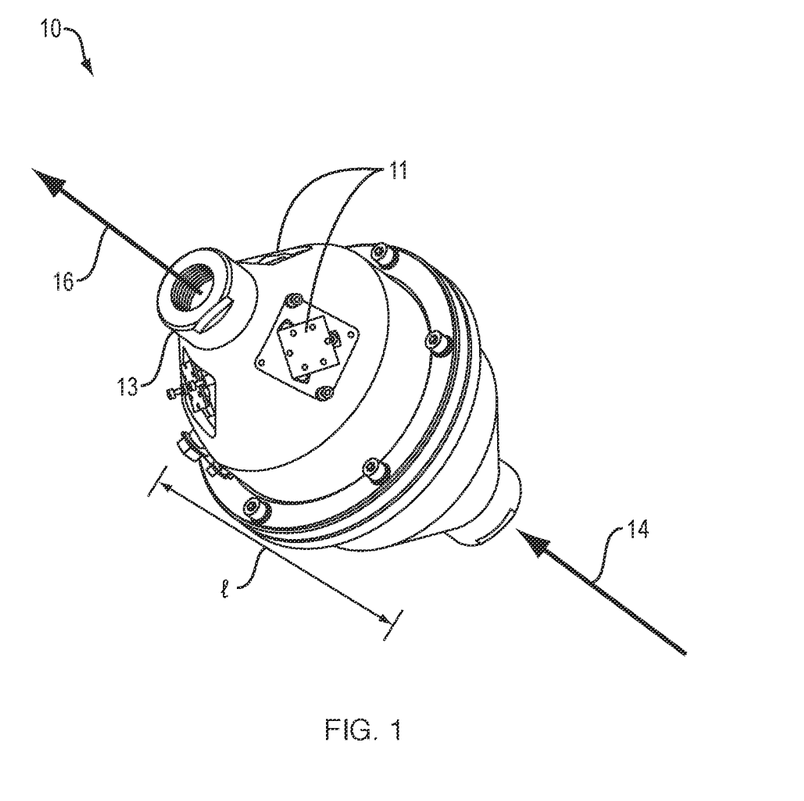
FIG. 1 is one embodiment of a water disinfection chamber with UV LEDs according to one aspect of the present invention.
Figure 2:
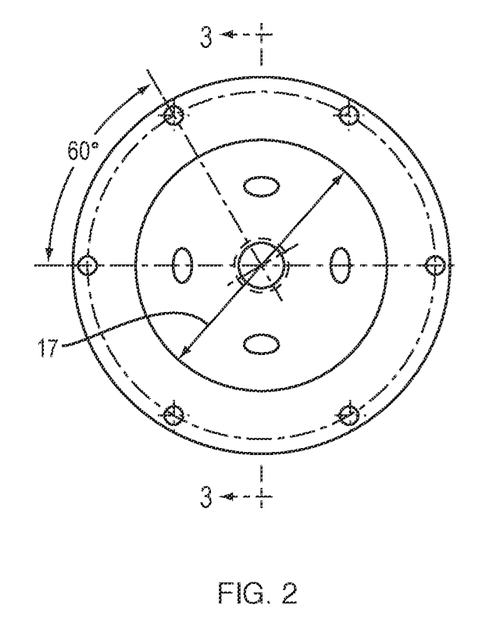
FIG. 2 is a cross-section of the outlet half of the water disinfection chamber illustrated in FIG. 1, and more specifically, the figure depicts the location of the LEDs in reference to the center of the chamber where an area of high intensity UV is developed due to the crossing of all beams. The high intensity zone is in-line with the outlet port.

In the preferred embodiment of the chamber according to the present invention, the current design has an inside diameter (ID) 17, FIG. 2, of 3.75" and 9.5" total length l FIG. 1. The cone outside angle is 35 degrees and the Teflon thickness on the interior of the chamber is 0.5". This design is scalable for up to 20 gal/min applications. A smaller tested design involves a chamber with less than 2" in ID and a total length of 6". These dimensions are not a limitation of the present invention but merely listed for exemplary purposes as someone skilled in the art would understand how to scale up or scaled down these chamber dimensions based upon need.

The UV radiation dose provided per individual chamber is computed as: d=I t measured in mJ/cm2 with I is the UV power density (or intensity) in mJ/cm2 and t is the time. Extensive experimental studies were conducted to estimate the amount of UV required to achieve a specific reduction rate of specific bacteriums and viruses. For instance, for *Escherichia coli* (*E-coli*), a dose of 10 milli-joules is sufficient to achieve 99.9% reduction. For a 10 gallon/min, with a 4" diameter chamber and 9" in length, the fluid velocity will be:

$$V = \frac{4 \times \text{flow rate}}{\pi \times d^2} = 0.0778 \text{ m/s}.$$

The time is related to the length of the chamber where:

$$t = \frac{L}{V} \approx 3 \text{ sec}.$$

L is the total length. Since an LED is a point source where the area is small the output power has to be much larger to provide a higher power density, therefore the need for reflection to fill the chamber with UV hence increasing the area and in turn the power density. t the time is directly proportional to the flow rate and the size (diameter) of the chamber.

Figure 5:
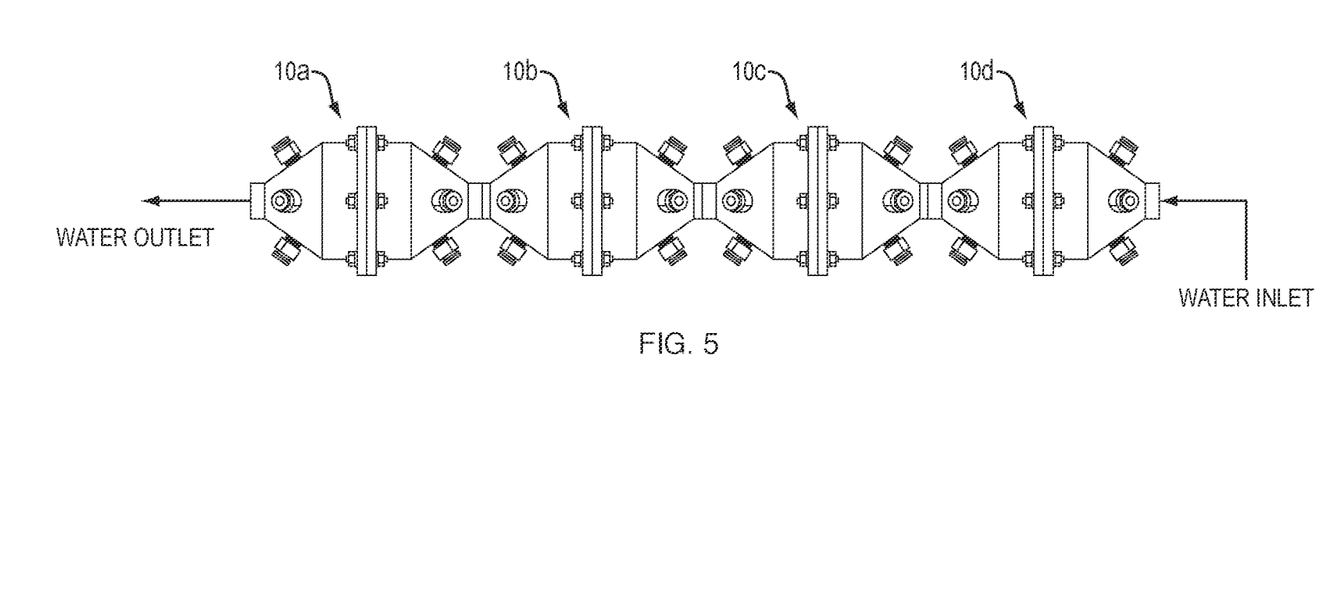
FIG. 5 Describes the series connection of multiple water disinfection chambers to increase DV dose for higher flow applications or to address pathogens that require higher UV radiation exposure.
Figure 6:
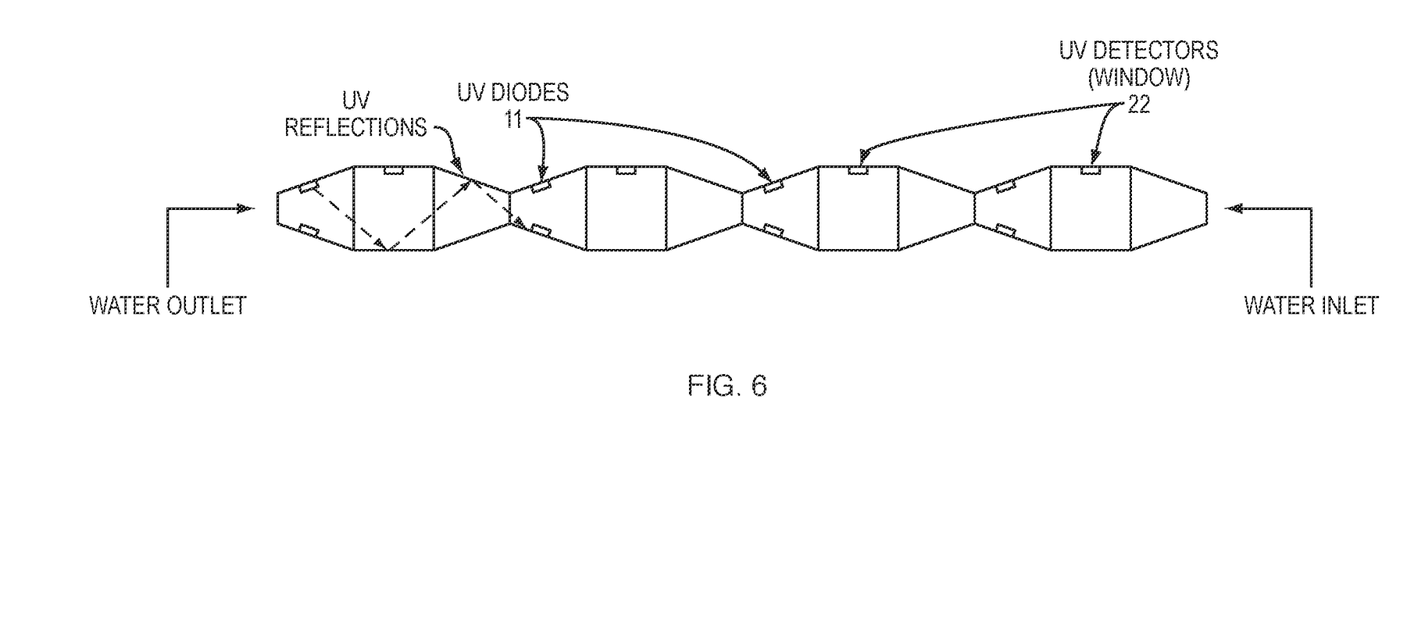
FIG. 6 Is a schematics representation of how a single UV beam travels through a water disinfection chamber.

A number of chambers 10, FIG. 5 can be connected in series to ensure the appropriate dose is delivered (preferred) with the total dose being the sum of the individual doses per chamber, such as:

$$D = \sum_{i=1}^{N} d_i$$

Where $d_i$ is the dose in chamber i and N is the number of connected chambers. Hey can also be connected in parallel to maintain low pressure drop in the system and in turn increase the flow rate capability without compromising the dose.

Figure 4:
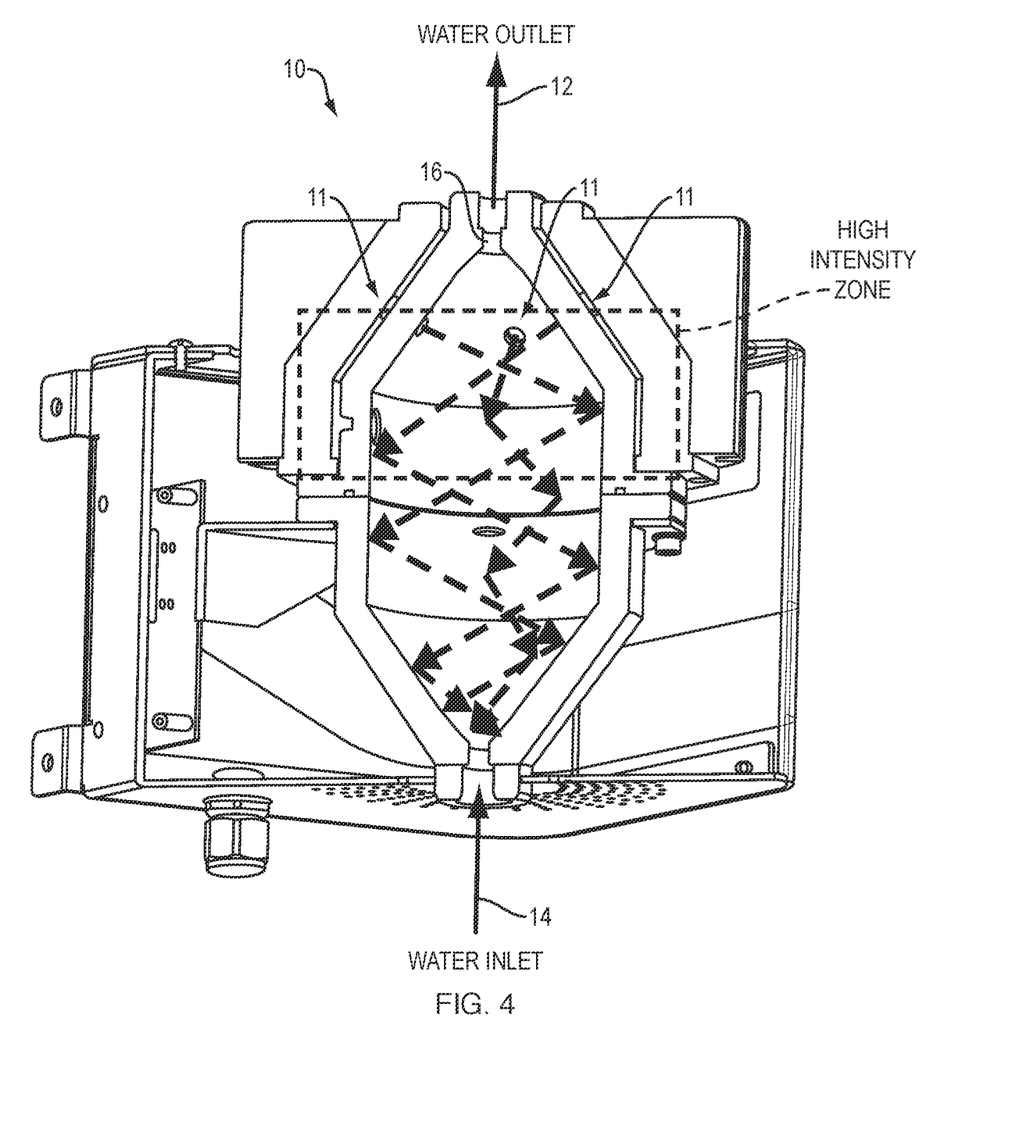
FIG. 4 is a schematic cross-sectional view of a water disinfection chamber according to the present invention schematically illustrating UV beams from multiple LEDs, wherein reflected beams inside the chamber fill the volume with UV and develop high intensity zones in the center of the chamber.

To ensure a chamber 10 fills at lower water flows FIG. 4, the chamber 10 may be mounted vertically with the outlet 16 on top and the inlet 14 on the bottom. Additionally, the chamber 10 may further include a flow restriction mechanism in the form of a neck or a flow restrictor 13 on the output 16. The neck 13 provides a means to restrict the maximum flow rate to a specific value. Further, the LEDs may be strategically located to provide the maximum intensity of UV radiation at the exit port and the appropriate angle of incidence for the light. Furthermore, the neck 16 serves to ensure that water flow is shared properly between chambers 10 in a parallel arrangement as showed in FIG. 7 without the need for the addition of a flow sharing mechanism. With conical ends, the chamber allows LEDs to be positioned at the angled ends of the chamber to create a specific angle of incidence of the UV beam. The neck area restricts the flow rate. A separate embodiment involves locating LEDs on both the inlet and outlet sides; with conical ends, LEDs positioned at the angled end to create a specific angle of incidence of the W beam. The neck area restricts the flow rate. A separate embodiment involves locating LEDs on both the inlet and outlet sides.

Figure 7:
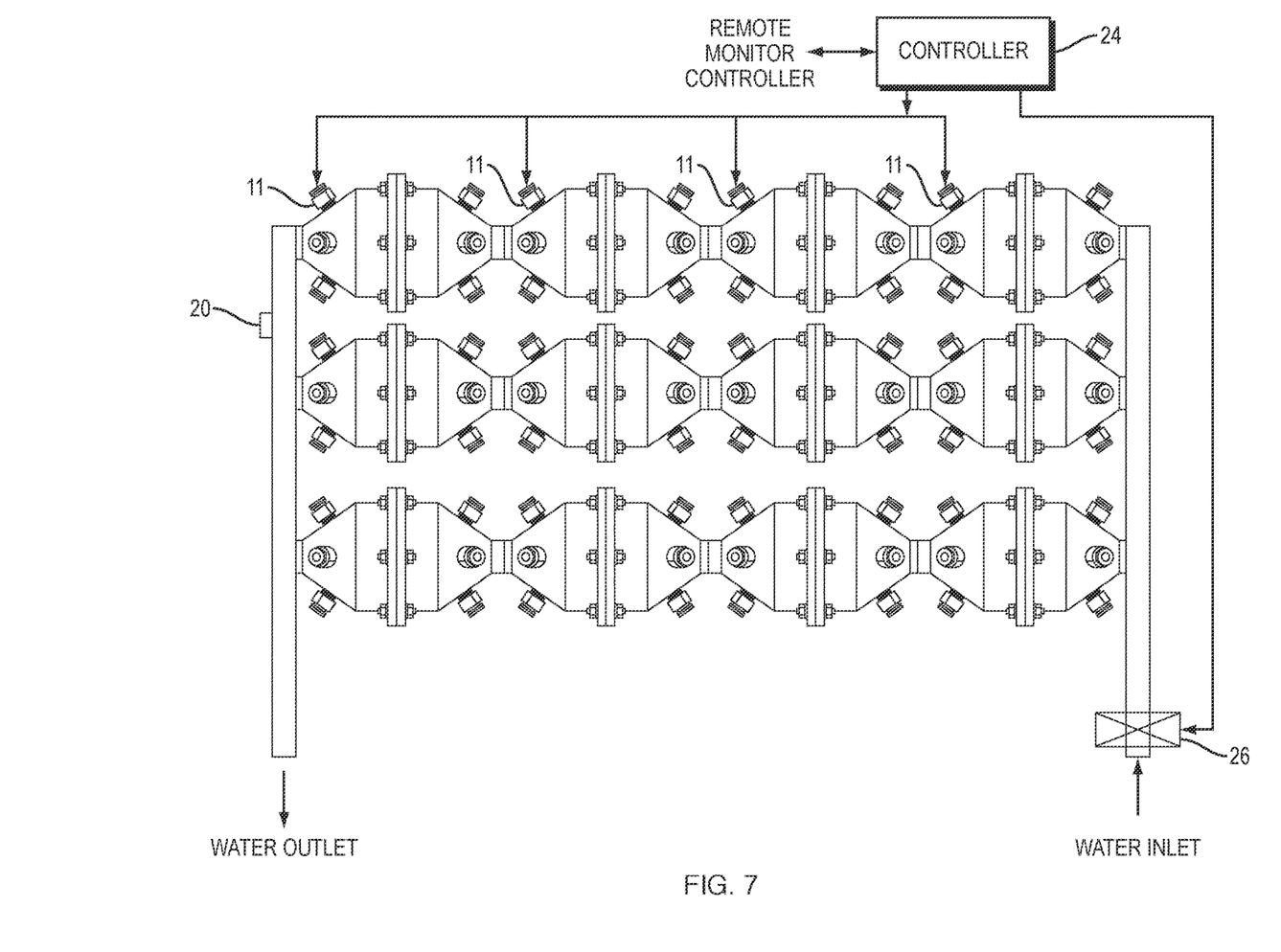
FIG. 7 describes a UV system according to one embodiment of the present invention including several water disinfection chambers connected in a series-parallel configuration to increase the UV dose and flow capability of such a system.

Due to the instant ON/OFF capability of the LEDs 11, the system can operate in an on-demand mode with the addition of a flow sensor 20 (shown only in FIG. 7 but can be installed in any system configuration). A flow sensor or pressure measurement device 20 may replace or be used in conjunction with the traditional UV detector 22 to create a disinfection loop where dose may be controlled by a wired or wireless connection to controller 24 as a function of flow rate, UV intensity, or both. Such an approach will further extend the life of the LED and improve the overall system performance.

Controlled operation results in higher efficiency, therefore, the system can further include a back-up power to extend operation during power outages. With an internet of things (IoT) capability the user will be able to control, monitor, and receive status updates or alerts via controller 24. If combined with a shutoff valve 26, untreated water can be prevented from flowing after a fault is detected.

Modifications and substitutions by one of ordinary skill in the art are considered to be within the scope of the present invention which is not to be limited except by the allowed claims and their legal equivalents.

The invention claimed is:

1. A water disinfection chamber comprising:
a chamber defined by walls and having an inlet, an outlet, and a central portion having a diameter, said inlet and said outlet having a conical shape including a first end having a diameter equal to said central portion diameter and a second end halving a diameter less than said central portion diameter and forming a chamber neck, and a plurality of LEDs mounted in at least said outlet of said chamber walls and disposed around a circumference of said chamber outlet, wherein in combination, said plurality of LEDs are configured for emitting a UV radiation dose of predetermined intensity in a desired germicidal UV range, wherein said flow of liquid flowing through said chamber has a predetermined fluid velocity, and wherein said UV radiation dose of predetermined intensity in a desired germicidal UV range is selected so as to disinfect a flow of liquid flowing through the chamber from said inlet to said outlet.

2. The water disinfection chamber of claim 1 wherein at least an interior region of the chamber walls is constructed with a UV reflecting material of an appropriate thickness of more than 1 mm.

3. The water disinfection chamber of claim 1 wherein said one or more LEDs are positioned to provide maximum intensity in a restricted flow area within said chamber and are positioned to direct the LED UV radiation to be reflected in a manner that fills the chamber with UV radiation.

4. The water disinfection chamber of claim 1 wherein said chamber includes a plurality of conical LED rings disposed in both said inlet and outlet of said chamber.

5. The water disinfection chamber of claim 1 wherein said UV-radiation dose from each of said plurality of LEDs intersect at one point to create a zone of very high irradiance.

6. The water disinfection chamber of claim 1, wherein said chamber further includes one or more water-flow reduction/restriction areas.

7. The water disinfection chamber of claim 6, wherein said one or more water flow reduction/restriction areas are provided in at least one neck region of said chamber, said at least one neck region disposed in one or more of said chamber inlet and chamber outlet.

8. The water disinfection chamber of claim 7, wherein said at least one neck region allows for multiple, parallel conical rings in which at least some of said plurality of LEDs are provided.

9. The water disinfection chamber of claim 1 wherein said chamber further includes a UV radiation dose diffusing window configured to fill said chamber with UV-C irradiation.

10. A UV disinfection system comprising a plurality of water disinfection chambers according to claim 1.

11. The UV disinfection system according to claim 10, wherein said plurality of water disinfection chambers are connected in series.

12. The UV disinfection system according to claim 11, wherein said UV disinfection system includes a first plurality of series connected water disinfection chambers and at least a second plurality of series connected water disinfection chambers, and wherein said first and at least said second plurality of series connected water disinfection chambers are arranged in a parallel configuration.

13. The UV disinfection chamber according to claim 1, wherein said disinfection chamber further includes a cooling structure for the plurality of LEDs that takes advantage of the fluid flow through said chamber with heat removed from the LEDs being directed to a separate area of the chamber through a thermal conductor to the neck area of the chamber or via a heat pipe.

14. The UV disinfection chamber according to claim 1, wherein said UV radiation dose of predetermined intensity "d" is computed according to the formula d=I t measured in mJ/cm2 wherein I is a UV power density (intensity) in mJ/cm2 and t is time, wherein said predetermined fluid velocity "v" is computed according to the formula $$V = \frac{4 \times \text{flow rate}}{\pi \times d^2} = 0.0778 \text{ m/sec}$$

and time "t" is computed according to the formula $$t = \frac{L}{V} \approx 3 \text{ sec}$$

where L is the length of the chamber.

15. A UV disinfection system comprising:
a plurality of UV disinfection chambers arranged in at least one of a series or parallel connection, each of said plurality of UV disinfection chambers comprising:
a chamber defined by walls and ends and having an inlet, an outlet, and a central portion having a diameter, said inlet and said outlet having a conical shape including a first end having a diameter equal to said central portion diameter and a second end having a diameter less than said central portion diameter and forming a chamber neck, and a plurality of LEDs mounted in at least said outlet of said chamber walls and disposed around a circumference of said chamber outlet, wherein in combination, said plurality of LEDs are configured for emitting a UV radiation dose of predetermined intensity in a desired germicidal UV range so as to disinfect a flow of liquid flowing through the chamber from said inlet to set outlet, said flow of liquid flowing through said chamber having a predetermined fluid velocity, wherein said UV radiation dose of predetermined intensity 'd' is computed according to the formula d=I t measured in mJ/cm2 wherein I is a UV-C power density (intensity) in mJ/cm2 and t is time, wherein said predetermined fluid velocity "v" is computed according to the formula $$V = \frac{4 \times \text{flow rate}}{\pi \times d^2} = 0.0778 \text{ m/sec}$$

and time "t" is computed according to the formula $$t = \frac{L}{V} \approx 3 \text{ sec}$$

where L is the length of the chamber;
at least one of a liquid flow measuring device or a liquid pressure measuring device, configured for providing a liquid flow measurement signal or a liquid pressure measurement signal; and
a controller, coupled to send at least one of a liquid flow measuring device or a liquid pressure measuring device and responsive to at least one of said liquid flow measurement signal or said liquid pressure measurement signal, for controlling said plurality of connected UV disinfection chambers and a disinfection loop formed by said plurality of connected UV disinfection chambers.

16. The UV disinfection system according to claim 15 wherein said controller is responsive to said at least one of a liquid flow measurement signal or a liquid pressure measurement signal, for enabling said LEDs to emit UV light when fluid flow or fluid pressure is detected, and for disabling said LEDs to emit UV light when fluid flow or fluid pressure is absent.

17. The UV disinfection system of claim 16, further including a communication system, coupled to said controller, for allowing remote monitoring and operation of said UV disinfection system.

18. The UV disinfection system of claim 17, wherein said communication system is configured to provide at least one of an alarm or a status update from said UV disinfection system via said controller coupled to said communication system.

* * * * *